United States Patent [19]

Bartfai et al.

[11] Patent Number: 5,442,763
[45] Date of Patent: Aug. 15, 1995

[54] SYSTEM AND METHOD FOR PREVENTING DEADLOCK IN MULTIPROCESSOR MULTIPLE RESOURCE INSTRUCTIONS

[75] Inventors: Robert F. Bartfai, West Shokan; Barry P. Lubart, Hurley; Julian Thomas, Lagrange, all of N.Y.

[73] Assignee: International Business Machines Corporation, Armonk, N.Y.

[21] Appl. No.: 350,242

[22] Filed: Dec. 6, 1994

Related U.S. Application Data

[63] Continuation of Ser. No. 757,746, Sep. 11, 1991, abandoned.

[51] Int. Cl.⁶ .................................................. G06F 13/00
[52] U.S. Cl. .............................. 395/375; 364/DIG. 1; 364/281.5
[58] Field of Search .............. 395/325, 375, 650, 725; 364/DIG. 1 MS File

[56] References Cited

U.S. PATENT DOCUMENTS

| | | | |
|---|---|---|---|
| 4,403,285 | 9/1983 | Kikuchi | 364/DIG. 1 |
| 4,807,111 | 2/1989 | Cohen et al. | 364/DIG. 1 |
| 4,809,168 | 2/1989 | Hennessy et al. | 364/DIG. 1 |
| 5,003,459 | 3/1991 | Ramanujan et al. | 364/DIG. 1 |
| 5,161,227 | 11/1992 | Dias et al. | 395/650 |
| 5,175,852 | 12/1992 | Johnson et al. | 364/DIG. 2 |
| 5,202,990 | 4/1993 | Saikawa | 395/650 |

FOREIGN PATENT DOCUMENTS 0140522  5/1985  European Pat. Off. ..... G06F 12/10

OTHER PUBLICATIONS

IBM Tech. Disclosure Bulletin, vol. 31, No. 11, Apr. 1989, pp. 136–141 "Fast Lock".
IBM Tech. Disclosure Bulletin, vol. 33, No. 3B, Aug. 1990, pp. 287–288 "Weak Locks . . . ".

Primary Examiner—Thomas M. Heckler
Attorney, Agent, or Firm—William A. Kinnaman; Mark S. Walker

[57] ABSTRACT

A system and method for preventing deadlock in a multiprocessor computer system executing instructions requiring multiple resources. The system detects potential deadlock situations where a multi-resource instruction is blocked from obtaining one of the resources. A multi-resource instruction global lock is provided that can be held by at most one processor. Upon conflict detection, the processor attempts to acquire the multi-resource instruction global lock and, if successful, resumes resource acquisition. The use of a global lock serializes multiple resource requests and assures that the processor holding the lock can eventually acquire all required resources without deadlock with another processor. The preferred embodiment acquires the global lock on an exception basis to minimize the overhead impact. However, an alternate embodiment which uses the global lock in each multiple resource instruction could also be implemented. Synonym detection logic is provided to detect the situation where a conflict is caused by address resolution to a synonymous lock by the processor.

24 Claims, 3 Drawing Sheets

SYSTEM AND METHOD FOR PREVENTING DEADLOCK IN MULTIPROCESSOR MULTIPLE RESOURCE INSTRUCTIONS

This application is a continuation of application Ser. No. 07/757,746, filed Sep. 11, 1991, abandoned.

BACKGROUND OF THE INVENTION

1. Field of the Invention

The present invention relates to electronic information processing systems, and in particular, to apparatus and methods for controlling access to resources in a multiprocessor environment.

2. Description of Related Art

Electronic information processing system hardware and operating system software designs require a means for ensuring the integrity of accesses to resources such as memory storage locations, external storage, and input or output devices. Resource conflicts may arise when several tasks attempt to access and change a resource. Single processor configurations manage resource conflicts using the inherent property that only a single instruction stream is executing with known points of control transfer. In the single processor case, operating system or application instructions can effectively manage resource control to maintain resource integrity. Multiprocessor systems introduce additional complexity because the contents of a single instruction stream no longer determine the overall access to resources.

Resource conflicts arise in a multiprocessor system when two or more processors attempt to control a single resource. Resource conflicts historically have been resolved by implementing mechanisms to serialize access to the resources. These mechanisms typically implement some form of resource lock allowing only a single processor to have control of a resource during any time period. Access by multiple processors is forced by this mechanism to occur serially rather than in parallel. In addition to the use of different lock forms, techniques for passive serialization exist that do not require locks (see U.S. Pat. No. 4,809,168 "Passive Serialization in a Multitasking Environment", commonly assigned).

Resource locks operate on the assumption that a processor will acquire the lock, perform the instruction and release the lock so that the resource is available for another processor. An instruction with a requirement to simultaneously access more than one resource can potentially lead to a deadlock situation if two processors are waiting for each other to release a needed lock. The first processor may be unable to complete task processing until it acquires a second resource held by a second processor which may be unable to complete its task processing until it acquires the resource held by the first processor. A deadlock of this nature typically requires the computer system to be restarted, an undesirable event in most large scale computer processing environments.

The multiprocessor deadlock potential has resulted in software and hardware designed to avoid requiring simultaneous access to more than one resource. The alternative is to implement a serialization mechanism that locks an entire class or several classes of resources to a single processor. For example, if memory storage representing a particular queue may be subject to multiple resource requests, access to the entire queue can be serialized through the use of a queue lock. The locking of large resource blocks is undesirable, however, when implementing basic operating system functions such as task scheduling or other time dependent queueing. The creation of a lock on the entire queue reduces throughput by locking and serializing processor access, thereby reducing the overall system processing efficiency.

A second problem of multiprocessor access to multiple resources is a potential loss of resource integrity. Simultaneous access and update of a resource can lead to corrupted data when two processors make conflicting changes to coordinated resources.

Time dependent queues are employed for many operating system functions where time dependent lists are required. For example, a task list queue containing a "first-in first-out" (FIFO) listing of the next tasks to be processed by a multiprocessor system is an essential work management tool. Allowing only single processor access to the entire list would prevent all other processors from inserting work in the queue and removing work for action until the first processor released the queue. This would increase task management overhead.

Multiprocessor queue design and usage has been optimized to minimize the number of locks that must be placed on operating system queues. As discussed above, serialization and locking are primarily required when multiple processor access to the same resources can create a deadlock situation or loss of resource integrity. Thus, if a queue can be designed so that each processor instruction requires only a single resource, e.g., a single storage location, then the potential of resource conflicts and therefore locking can be minimized.

Locks can be provided in a system in increasing degrees of granularity. A fine grained lock system provides locks on small resource units, e.g., a few hundred bytes of storage. Locking systems with less granularity, large grained, provided locks only at a higher level, e.g., on entire data structures or entire resource units such as a storage queue. A fine grained locking scheme reduces the overhead caused by locks blocking processor action, but increases the likelihood of deadlock if multiple resource units are required to complete a given instruction.

A general queue model allows insertion of an entry at any point in the queue and removal of any entry in the queue. Queues are typically implemented as a singly, or doubly, linked list of addresses in a computer system. Each element of the queue contains the address of the next element. The addition of an element within a list therefore typically requires the update of two addresses in a singly linked list and four in a doubly linked list. In the case where two addresses must be updated, since each occupies a separate storage location, two storage locations must be accessed and updated to accomplish the queue insertion. System integrity and reliability require that these address updates be performed "atomically". That is, the update of both addresses must occur without potential interruption of processing between the updates. It must look as though a single instruction is being performed with the update of two addresses. This is known as an "atomic" instruction since it is one that cannot be further subdivided or interrupted during processing. In a system where each storage location is provided with a lock, multiprocessor update of two storage locations raises a high probability of deadlock or data corruption. The only clear alternative is to serialize access to the entire queue with the performance problems listed above.

Operating systems can overcome some of those restrictions by implementing optimized queues where elements can only be added at the tail, a process that requires only a single address update. The single address update does not have the same deadlock risk and therefore the operating system can allow multiple processors to add elements to the list. Removing an element from the queue, however, still requires multiple address updates and therefore must be restricted to a single processor. Thus, in the implementation, dequeuing must be serialized to a single processor.

The existing technical problem, therefore, is a loss of system efficiency because efficient forms of queuing cannot be implemented due to the risk of machine deadlocks and loss of resource integrity. A system allowing a multiprocessor system to atomically update multiple resources without risk of deadlock is required to enhance queue management.

SUMMARY OF THE INVENTION

It is therefore an object of the present invention to provide a deadlock avoidance system and method that will allow a multiprocessor computer system to atomically access multiple resources without the risk of a deadlock between processors.

The present invention provides a means for detecting potential resource conflict when multiple resources are required and for acquiring a global lock on an exception basis when processor resource conflicts exist.

The system and method of the present invention allow the implementation of more generalized queuing models with enhanced system function as a result. In addition, this deadlock avoidance system and method does not impact other system operations by imposing a large locking overhead or by requiring that resources be accessed in a certain order or in a certain way. The present invention sequentially attempts to access required resources and tests for resource conflicts after each attempt. The system has a multiple resource global lock that may be held by at most one processor thereby limiting the number of concurrently executing multiple resource instructions to one. Use of the lock only in conflict situations minimizes system overhead impact.

In addition, the present invention recognizes and manages storage lock conflicts caused by synonymous lock generation.

These and other objects of the invention will be explained in greater detail with reference to the attached drawings.

DETAILED DESCRIPTION OF THE PREFERRED EMBODIMENT

The preferred embodiment of this invention implements an enhanced queue management system that detects and avoids resource deadlocks. The preferred embodiment controls the update of two storage locations and is thus an example implementing a "dual atomic" update instruction. Although the preferred embodiment illustrates the control of only two resources, the techniques described herein are applicable to any number of resources that must be controlled during execution of a multiresource atomic instruction.

The present invention is designed to be implemented on a computer system that provides fine grained storage locks, e.g., on a few hundred bytes of storage. In the preferred embodiment, the locks are provided in the form of storage cache lines that can be acquired by at most one processor to control a few hundred bytes of cache reference by that line. The use of cache lines to serialize storage access is well known in the art.

Figure 1A:
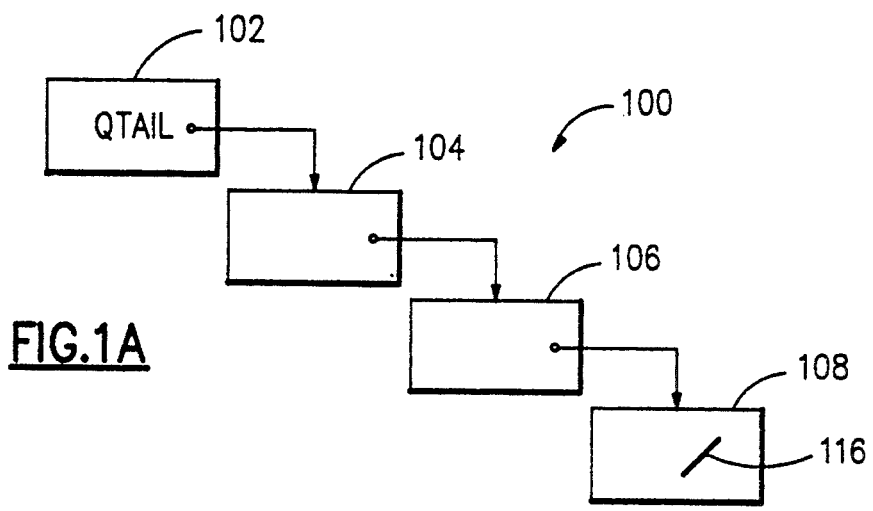
FIG. 1A is a schematic diagram of a single-headed FIFO queue.

Examples of two of the types of queues that can be managed with the assistance of a deadlock avoidance techniques of the present invention, are illustrated in FIGS. 1 and 2. FIG. 1A illustrates a single-headed FIFO queue 100 for managing, e.g., a list of tasks. The queue anchor 102 (QTAIL) is an address pointing to the newest element in the queue 104. Queue anchor 102 is null when queue 100 is empty. Element 104 contains the address of next oldest element 106 which, in turn, contains the address of element 108. Element 108, as the last element in the queue (the oldest), contains an indication 116 that this is the last element of queue 100. Typically, this indication would be in the form of a null address pointer.

Figure 1B:
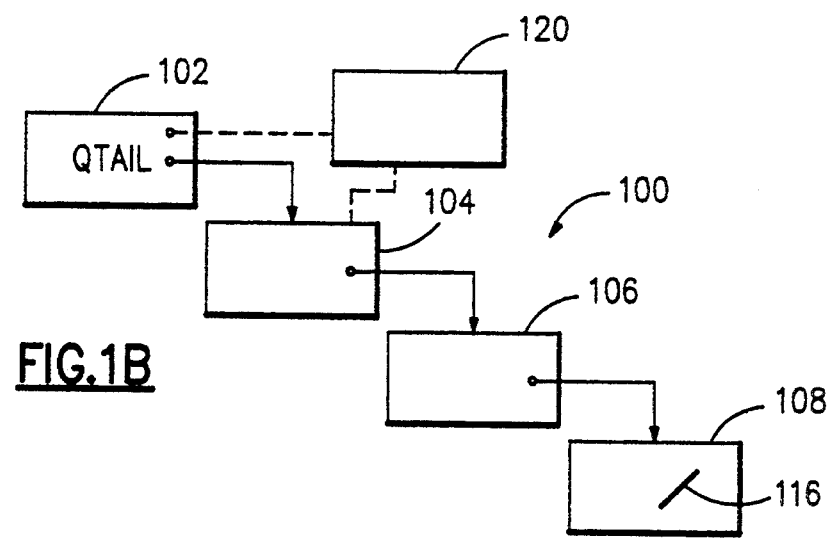
FIG. 1B is a schematic diagram showing the effects of adding or removing an element from the single-headed queue of FIG. 1A.

The insertion of an element into queue 100 is shown in FIG. 1B. The addition of element 120 requires that the queue anchor 102 now point to new element 120. The address pointer of 120 must point to the former contents of the queue anchor 102, i.e. to element 104. This last change must be done atomically. The removal of an item from the queue is also shown in FIG. 1B. Removal of item 108 is accomplished by searching down the entire queue chain and when the last element is found, changing the pointer to the last element 106 to null. If 108 was the only element in the queue, then queue the anchor would be changed to null. Due to the potential for queue corruption, this must be managed atomically which currently requires the entire queue to be locked to a single processor.

Figure 2A:
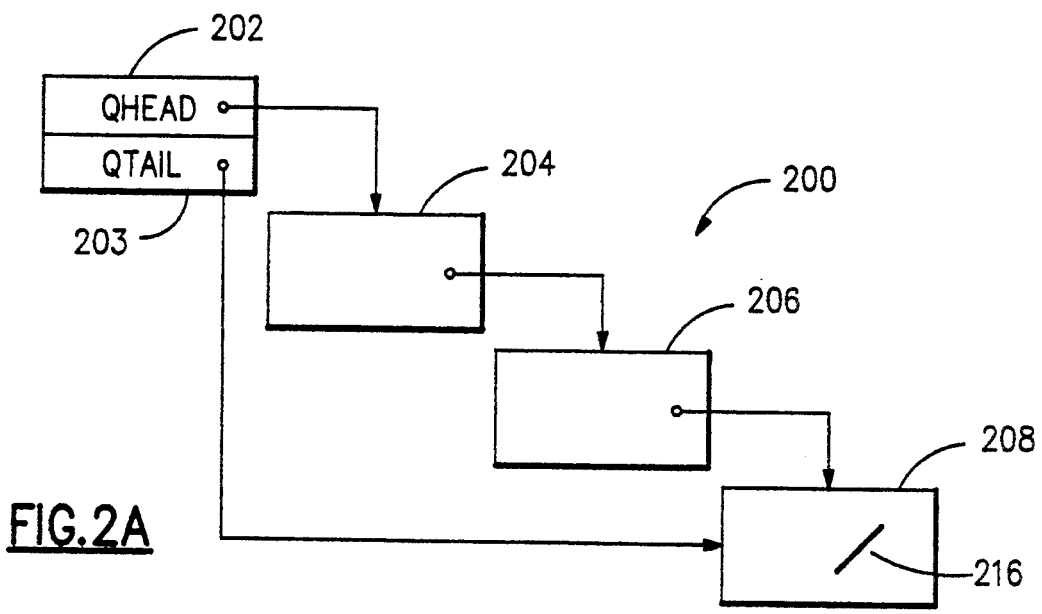
FIG. 2A is a diagram of a double-headed queue.
Figure 2B:
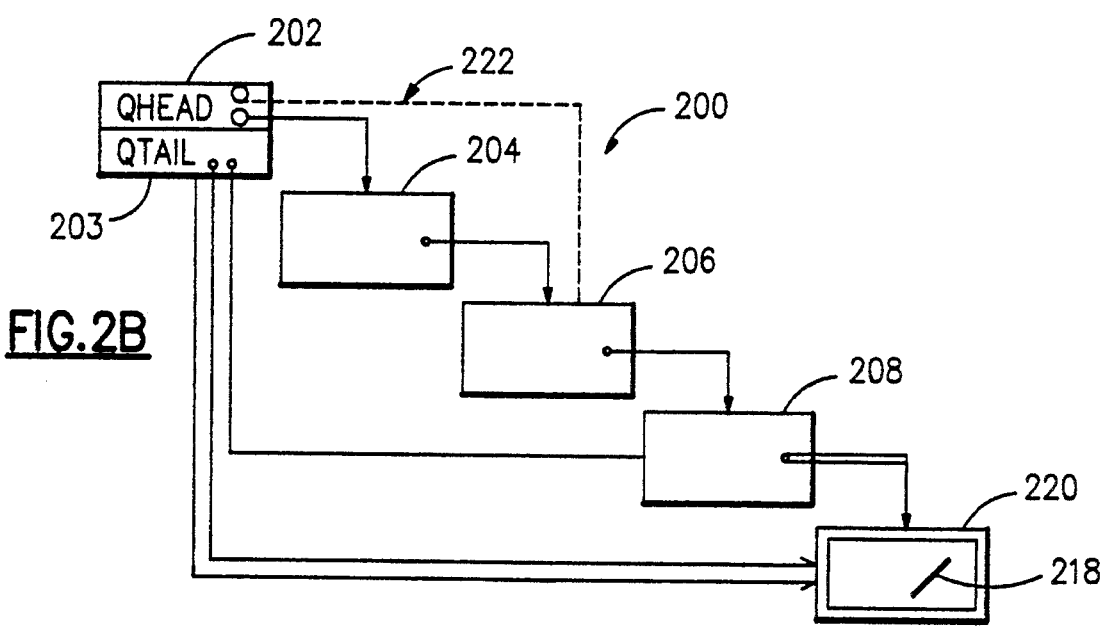
FIG. 2B illustrates the insertion and deletion of an element from the double-headed queue of FIG. 2A.

Double-headed FIFO queues are shown in FIG. 2A and FIG. 2B. The doubled-headed queue has a pointer both to the first (oldest) element (queue head) and to the last (newest) element (queue tail). This structure allows the elements to be inserted at either end and removed from either end without tracing the pointers through the list. Use of double-headed queues can offer significant performance improvements to system programs. However, the insertion of a new element 220 at the tail of the list requires updates to two pointers thereby increasing the deadlock risk in a multiprocessor configuration.

Figure 3:
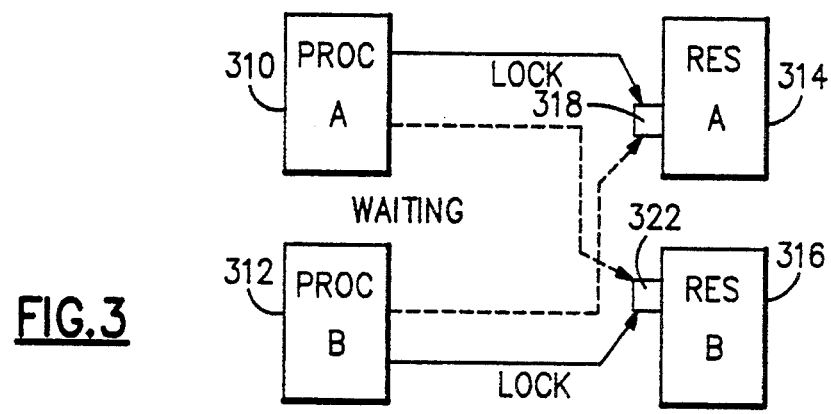
FIG. 3 is a block diagram showing a deadlock situation arising where multiple resource conflicts exist.

The resource deadlock situation is illustrated in FIG. 3. In a queue insertion situation such as insertion of element 220, two storage locations must be updated. In the example of FIG. 2B the storage location in element 208 must be updated to contain the address of new element 220 while the address point in queue tail 203 must also be changed to the address of 220. FIG. 3 illustrates this update in a multiprocessor system with processors A and B. Storage location 208 (resource A in FIG. 3) and storage location 203 (resource B in FIG. 3) must be reserved and atomically updated by a processor. If processor A 310 begins the process of locking and updating the queue, it may access resource a, and obtain the lock 318 on that resource. In the meantime, processor B may have acquired a lock 322 on resource B 316 as a first step to performing a similar update. When processor A then goes to obtain lock 322 on resource B, it is unable to do so because processor B holds the lock 322 and processor A goes into a waiting condition. At the same time, processor B may be seeking lock 318 on resource A and, finding it locked, begin waiting for process A to release resource A. In this classic deadlock situation, neither process will be able to complete and neither will release the blocking lock.

In the preferred embodiment of the present invention, microcode or hardware are added to the computer system to support instructions requiring multiple resource control. Instructions requiring control of only a single resource and multiple resource instructions that successfully acquire all resource locks operate as they do in existing computer systems. However, when a multiple resource instruction encounters a currently held lock it invokes the deadlock avoidance mechanism of the present invention.

Figure 4:
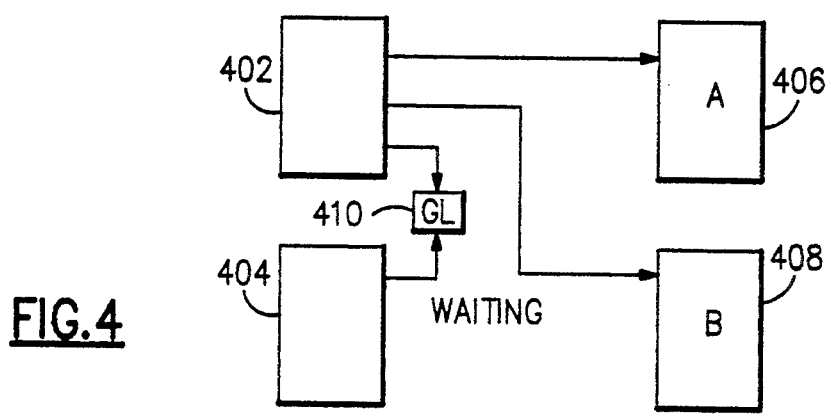
FIG. 4 is a block diagram illustrating the logical structure of the deadlock avoidance system of the present invention.

The central feature of the deadlock avoidance mechanism is a global lock for multiple resource request instructions. As shown in FIG. 4, the global lock 410 is accessible to all processors but can be controlled by only one at a time. In the preferred embodiment, the multiple resource instruction global lock is acquired only on an exception basis. That is, if multiple processors can access multiple resources without conflict, they do so without the use of the global lock 410. The global lock is only acquired when a conflict is detected. This reduces the overhead imposed by such a lock thereby increasing the throughput of the system. In an alternate embodiment, however, the multiple resource instruction global lock 410 could be acquired whenever a multiple resource instruction is encountered, although this will increase the overhead.

Figure 5:
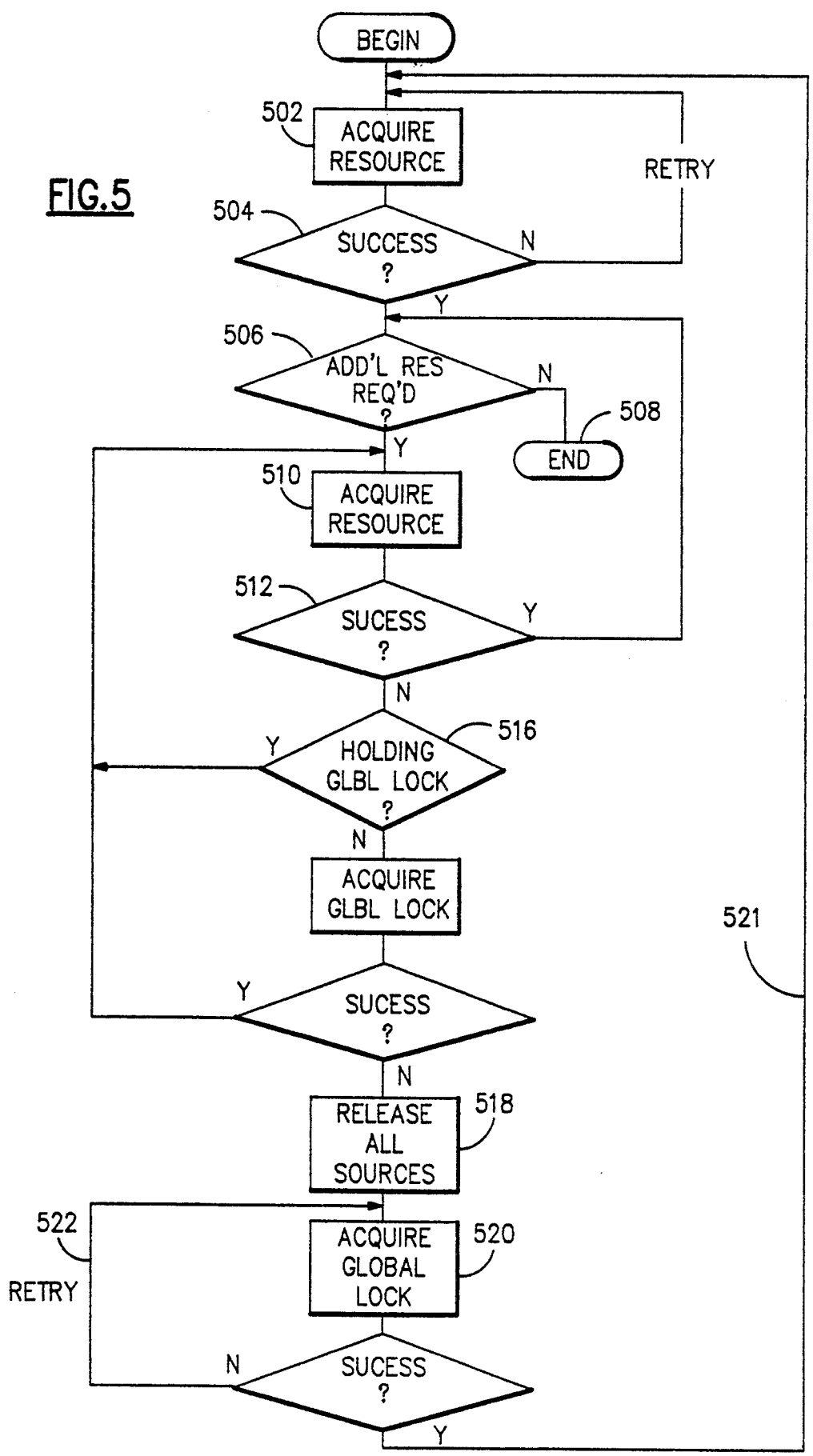
FIG. 5 is a flowchart depicting the method steps of the preferred embodiment of the present invention.

A flowchart illustrating the operation of the present invention is shown in FIG. 5. FIG. 5 illustrates the processing logic for a single instruction. The instruction first attempts to acquire the first resource step 502. The result of this acquisition is tested 504 and, if unsuccessful, the processor waits and retries the operation, e.g., by entering a spin loop. If the first resource acquisition 502 is successful, the processor determines whether additional resources are required 506 (i.e. this is a multiprocessor instruction). If not, resource acquisition ends and instruction processing continues 508. If additional resources are required, acquisition is attempted 510 with test 512 determining acquisition success. If successful, control returns to step 506 to continue acquiring any additional needed resources. If acquisition fails, the processor determines whether or not it is holding the global lock 516. If so, the processor will not be entering a potential deadlock situation and can wait and retry the resource access. Since the current processor holds the global lock, any other processor locking the resource is locking it for only a single resource access and will eventually release that lock without deadlocking.

If the global lock is not held, the processor attempts to seize the global lock, and, if successful, acquires the additional resource 510. If the processor cannot seize the global lock, the processor releases all previously acquired resources 518 and attempts to acquire the global lock 520. If the global lock acquisition is successful, control returns to acquisition of resources beginning with the first required resource at 502. If unsuccessful, the processor waits and retries the global lock acquisition.

The preferred embodiment is an exception-based process, thereby minimizing system overhead. The step of acquiring the global lock, however, could be moved to the beginning of the process with some increase in overhead. The global lock can comprise a hardware latch, a lock area in system storage, a cache line or any other serialization mechanism. Because the present invention does not rely on a particular acquisition order, the processor and instruction can acquire resources in the optimal order.

In an alternate embodiment, additional testing for lock synonyms is inserted after step 512 (not shown in the figure). If storage location locks are implemented by a system such as cache lines, there is a possibility that two storage locations will translate to the same cache line, a process known as having a synonymous cache line. In this case, the attempt to access and lock the second storage location will fail since the cache line is already locked for the first storage location. Upon failure in this alternate embodiment, a test for synonyms is made and, if a synonymous cache line is found, processing continues as though that lock had been acquired and held. The addition of synonym detection logic assures that a multiple resource instruction will eventually be able to execute. Without it, the instruction may be blocked even if holding the global lock. Synonym detection logic can recognize synonyms by recording in a separate field cache lines owned by a processor or by marking each owned cache line with the owning processing unit identifier.

The present invention employs memory access serialization instead of locking the queue itself. This allows asynchronous manipulation of lists by any number of processors acting as queue element adders or deleters. This capability allows enhanced queue management with corresponding improvements in system operation.

It will be understood from the foregoing description that various modifications and changes may be made in the preferred embodiment of the present invention without departing from its true spirit. It is intended that this description is for the purposes of illustration only and should not be construed in a limiting sense. The scope of this invention should be limited only by the language of the following claims.

We claim:

1. A method for preventing resource acquisition deadlock in a computer system having a plurality of disjoint resources, a plurality of processors, each processor executing instructions including instructions requiring exclusive control of a subset of said plurality of resources, said system having respective individual locks for acquiring exclusive control of said resources on an individual basis and a global lock for acquiring exclusive control of said plurality of resources on a global basis, with said global lock being controlled by at most one of said processors at a time, the method comprising the steps of:

(a) acquiring the individual lock for a first of said subset of said plurality of resources;

(b) for each remaining resource of said subset of said plurality of resources;
   (1) attempting to acquire the individual lock for said resource;
   (2) testing to determine if the individual lock for said resource is granted;
   (3) if the individual lock for said resource is denied:
      (A) attempting the acquire said global lock;
      (B) if said global lock is denied, releasing all individual locks and waiting until said global lock is available; and
(c) once said global lock is controlled, repeating attempts to acquire the individual lock for each of said subset of said plurality of resources until successful.

2. The method of claim 1 wherein said resources are memory storage locations and exclusive control is managed by a plurality of cache lines, each cache line controlling a plurality of storage locations.

3. The method of claim 2, further comprising the steps of:
if the individual lock for said next one of said plurality of resources is denied, testing said next resource to determine whether a cache line under control of said processor is synonymous with a cache line required to obtain the individual lock for said next resource, and, if so, signalling said processor that exclusive control is granted.

4. An information processing system queue management method for maintaining ordered lists, said method operating on a system having a plurality of processors, said ordered lists being maintained by updating a plurality of storage locations, the method comprising the steps of:
determining which of said plurality of storage locations require updating to maintain said ordered lists;
acquiring exclusive control of a first of said storage locations requiring updating;
attempting to acquire a subsequent one of said storage locations requiring updating and, if exclusive control of all required storage locations is held, updating said locations;
detecting an acquisition failure, and
invoking a deadlock avoidance process upon detection of an acquisition failure, and updating said storage locations once exclusive control is obtained.

5. The method of claim 4, wherein said deadlock avoidance process comprises the steps of:
attempting to acquire exclusive control of a multiple resource global lock for said storage locations;
if successful, attempting to acquire exclusive control of all outstanding resources until successful;
if exclusive control of said global lock is denied, waiting and periodically retrying said acquisition.

6. In a computer system in which tasks running concurrently on one or more processors perform operations requiring exclusive control of one or more of a plurality of system resources, said system having respective individual locks for acquiring exclusive control of said resources on an individual basis and a global lock for acquiring exclusive control of said resources on a global basis, said global lock being held by at most one task at a time, a method of acquiring exclusive control of the resources necessary for the performance of one of said operations by one of said tasks, comprising the steps of:
attempting to acquire the individual lock for each resource necessary for the performance of said operation;
if the individual lock for each resource necessary for the performance of said operation is acquired, performing said operation without acquiring said global lock; and
if the individual lock for any resource necessary for the performance of said operation is denied, acquiring said global lock before performing said operation.

7. The method of claim 6 wherein each of said tasks runs on a different processor.

8. The method of claim 6 wherein said step of acquiring said global lock comprises the steps of:
attempting to acquire said global lock; and
if said global lock is denied, releasing any individual lock acquired so far by said task.

9. The method of claim 6 wherein said operations comprise the execution of instructions.

10. The method of claim 6 wherein each of said resources comprises one or more storage locations.

11. The method of claim 6 wherein said global lock is acquired only if a plurality of resources are necessary for the performance of said operation and at least one individual lock is already held when an individual lock is denied.

12. In a computer system in which a plurality of processors each perform operations requiring exclusive control of one or more of a plurality of system resources, said system having respective individual locks for acquiring exclusive control of said resources on an individual basis and a global lock for acquiring exclusive control of said resources on a global basis, said global lock being held by at most one processor at a time, a method of acquiring exclusive control of the resources necessary for the performance of one of said operations by one of said processors, comprising the steps of:
attempting to acquire the individual lock for each resource necessary for the performance of said operation;
if the individual lock for each resource necessary for the performance of said operation is acquired, performing said operation without acquiring said global lock; and
if the individual lock for any resource necessary for the performance of said operation is denied, acquiring said global lock before performing said operation.

13. The method of claim 12 wherein said step of acquiring said global lock comprises the steps of:
attempting to acquire said global lock; and
if said global lock is denied, releasing any individual lock acquired so far by said processor.

14. The method of claim 12 wherein said operations comprise the execution of instructions.

15. The method of claim 12 wherein each of said resources comprises one or more storage locations.

16. The method of claim 12 wherein said global lock is acquired only if a plurality of resources are necessary for the performance of said operation and at least one individual lock is already held when an individual lock is denied.

17. In a computer system in which tasks running concurrently on one or more processors perform operations requiring exclusive control of a plurality of system resources, said system having respective individual locks for acquiring exclusive control of said resources on an individual basis and a global lock for acquiring exclusive control of said resources on a global basis, said global lock being held by at most one task at a time, a method of acquiring exclusive control of the resources necessary for the performance of one of said operations by one of said tasks, comprising the steps of:

acquiring the individual lock for a first resource necessary for the performance of said operation;

attempting to acquire the individual lock for each additional resource necessary for the performance of said operation;

if the individual lock for each additional resource necessary for the performance of said operation is acquired, performing said operation without acquiring said global lock; and if the individual lock for any additional resource necessary for the performance of said operation is denied, acquiring said global lock before performing said operation.

18. The method of claim 17 wherein said step of acquiring said individual lock for said first resource comprises the steps of:

attempting to acquire said individual lock; and if said individual lock is denied, continually retrying to acquire said individual lock until successful.

19. The method of claim 17 wherein said step of acquiring said global lock comprises the steps of:

attempting to a acquire said global lock; and if said global lock is denied, releasing any individual lock acquired so far by said task.

20. The method of claim 17, further comprising the step of:

upon acquiring said global lock, acquiring the individual lock for each resource necessary for the performance of said operation that is not already held by said task.

21. In a computer system in which tasks running concurrently on one or more processors perform operations requiring exclusive control of one or more of a plurality of system resources, said system having respective individual locks for acquiring exclusive control of said resources on an individual basis and a global lock for acquiring exclusive control of said resources on a global basis, said global lock being held by at most one task at a time, a method of acquiring exclusive control of the resources necessary for the performance of one of said operations by one of said tasks, comprising the steps of:

acquiring the individual lock for a first resource necessary for the performance of said operation;

determining whether any additional resources are necessary for the performance of said operation; and if no additional resources are necessary for the performance of said operation, performing said operation, otherwise:

attempting to acquire the individual lock for each additional resource necessary for the performance of said operation;

if the individual lock for each additional resource necessary for the performance of said operation is acquired, performing said operation without acquiring said global lock; and if the individual lock for any additional resource necessary for the performance of said operation is denied, acquiring said global lock before performing said operation.

22. The method of claim 21 wherein said step of acquiring said individual lock for said first resource comprises the steps of:

attempting to acquire said individual lock; and if said individual lock is denied, continually retrying to acquire said individual lock until successful.

23. The method of claim 21 wherein said step of acquiring said global lock comprises the steps of:

attempting to acquire said global lock; and if said global lock is denied, releasing any individual lock acquired so far by said task.

24. The method of claim 21, further comprising the step of:

upon acquiring said global lock, acquiring the individual lock for each resource necessary for the performance of said operation that is not already held by said task.

* * * * *